United States Patent Office 3,186,923
Patented June 1, 1965

3,186,923
PROCESS FOR IMPROVING THE LOW MOLECULAR WEIGHT YIELD IN BARK PYROLYSIS
Warren Irl Lyness, Cincinnati, Ohio, assignor to The Buckeye Cellulose Corporation, Cincinnati, Ohio, a corporation of Ohio
No Drawing. Filed June 12, 1961, Ser. No. 116,244
7 Claims. (Cl. 202—10)

This invention relates to new and useful improvements in the production of low molecular weight degradation products from waste vegetable materials by pyrolysis procedures. More particularly, this invention relates to the discovery that waste vegetable materials such as bark, wood waste, nut shells, by-product lignins, etc., which are rich in polyphenolic content, can be degraded in the presence of a specific organic vapor by pyrolytic methods wherein the degradation products are swept from the pyrolysis chamber by a gaseous stream to result in superior yields of such low molecular weight materials as guaiacol, alkyl guaiacols, vanillin, and catechol.

Extensive studies and applications have been made of the general methods of pyrolyzing wood and wood waste for the purpose of utilizing the large amounts of such materials currently wasted by the wood-using industries. Also, the pyrolysis of hardwoods has for many years been a commercial source of such chemicals as acetic acid and methanol in addition to the production of charcoal. All of these prior experimental and commercial practices for deriving chemical values from vegetable materials are well documented and require no further explanation in reference to the present invention, but it will be recognized that the general practice of pyrolysis would be greatly enhanced if the yield of low molecular weight phenols from selected raw materials rich in these materials were substantially increased.

In the usual pyrolysis procedure of the prior art, the material to be pyrolyzed is enclosed in an air-tight chamber and external heat is applied to initiate reactions which are at first endothermic and then as a critical temperature is reached, exothermic; the processed material is decomposed to carbon and the volatile materials are driven off by heat to be condensed or collected in a suitable fashion. The advent of fluidized bed techniques led to experimental work in the field of wood utilization wherein the vegetable material was comminuted and fluidized with a non-reactive gas such as carbon dioxide, nitrogen, or superheated steam. The non-reactive gas served the dual purposes of supplying the necessary heat for pyrolysis and continually carrying away the pyrolysis products formed. This continual sweeping of the pyrolytic chamber presumably favored the production of low molecular weight products by preventing a condensation type reaction of the original pyrolysis products to higher molecular weight compounds under the influence of the temperature of the pyrolysis.

The present invention, however, consists of the discovery that the presence of a specific organic vapor in the sweeping gaseous stream in the pyrolysis of polyphenolic-rich vegetable materials will further substantially increase the yield of low molecular weight products.

It is therefore, an object of this invention to provide a pyrolytic process whereby the low molecular weight product yield from waste vegetable materials of otherwise poor economical benefit may be substantially doubled. As is well known in the art, the chemical values derived from the pyrolysis of wood or vegetable materials are the condensable tars and oils, usually light brown in color, evolved during the pyrolysis. The values herein reported for pyrolysis yields are the weights of such condensed tars and oils after evaporation to dryness in an inert atmosphere, thus removing the factor of moisture variability in the raw material.

It is also an object of this invention to provide an economically and technically attractive method by which the valuable low molecular weight products such as guaiacol, alkyl guaiacols, vanillin, and catechol, which are potentially present in materials of vegetable origin, such as barks, lignins, tannins, lignite, nut shells, hogged woods, sawdust, brush, etc., may be obtained in superior yield.

It is a further object of this invention to provide a process for the utilization of vegetable waste as a source of commercial chemicals in order to increase the available supply of guaiacols, alkyl guaiacols, vanillin and catechol, as well as to provide a source of income from what are otherwise generally waste materials.

Specifically the present invention consists of the discovery that the use of formic acid vapor as the sweeping gaseous stream or the addition of formic acid vapor to the sweeping gaseous stream will effectively increase the quantity of low molecular weight materials obtained from the pyrolysis of polyphenolic-rich vegetable materials.

In carrying out the herein disclosed invention, pine bark, or other material rich in polyphenols, the dimensions of the materials are selected so that at least one dimension of the resulting pieces does not exceed about 2 inches, with the preferred limiting dimension not exceeding about ¼ inch. The limitations in size are dependent only on the above mentioned prevention of a condensation type reaction of the original monomer and oligomer pyrolysis products to higher molecular weight compounds taking place in the wood during the pyrolysis and the provision of sufficient free space between the pieces of material for vapor contact and facile removal of pyrolysis products. In regard to the provision of free space for vapor contact, the tarry, amorphous materials subject to slumping during pyrolysis can be pelletized or suspended on charcoal to satisfy the requirement. The comminuted material is then heated to between about 150° C. and about 500° C., with the temperature range of about 400° C. to about 450° C. being preferred, in a closed chamber held at a reduced pressure, e.g., 20 to 100 millimeters of Hg. It is noted that while increased yields of low molecular weight products over yields obtained by the techniques of the prior art are obtained at the lower end of the temperature range specified, the preferred temperature range for the highest yields of the lower molecular weight materials is about 400° C. to about 450° C. The chamber is swept with formic acid vapors or formic acid vapors together with an inert non-oxidizing gas or vapor, such as nitrogen, carbon dioxide, superheated steam or mixtures thereof in such a manner that the gas stream passes thru the comminuted, polyphenolic rich, material. In the case of amorphous or tarry raw materials, or ones which soften at high temperature, such as the lignins, it was found preferable to pelletize the material, support it on carbon, or otherwise provide for the passage of the gas stream thru the material. The resulting low molecular weight monomers, or oligomers, related to polyphenols and produced during the pyrolysis, are removed from the effluent stream by condensation followed by evaporation or decantation of the condensed water together with the undecomposed formic acid. Practice of the process has revealed that increased yields are obtained with the use of about 1 to about 3 parts by weight of formic acid per part by weight of vegetable material during the pyrolysis, but the preferred usage is about 2 parts by weight of formic acid per part of material to result in an optimum yield.

A moderately fast rise to the 450° C. temperature was discovered to be desirable for increased yields of the low molecular weight materials and about 90 minutes time is preferred for the pyrolysis cycle; the total time of pyrolysis can be lengthened or shortened by varying the heat supplied in the sweeping gas stream or directly to the pyrolysis chamber to result in a period of from about 5 minutes to one exceeding 4 hours.

In the following examples there are illustrated the preferred embodiments of this invention, but it is understood that the examples are not to be construed as limiting the scope of the invention.

EXAMPLE I

To obtain the results given for formic acid in Table I below, approximately 35 grams of air-dry Southern pine bark of known moisture content were loosely packed in a glass reactor tube of 27 mm. O.D. giving a packed length of about 12 inches. A thermometer was sealed into the top of the tube so that the bulb was near the center of the packed section. A side-arm near the top of the tube permitted the charging of the bark and, during the pyrolysis, the introduction of nitrogen and formic acid vapor. The flow of the nitrogen gas was measured with a flow-meter at room temperature and atmospheric pressure, and the flow of formic acid vapor was measured by means of a burette prior to vaporization. Nitrogen was introduced into the system as a gas at the rate of 20 ml. per minute, and formic acid was fed as a liquid at the rate of 0.8 ml. per minute. The feed rate of the formic acid resulted in the use of about 2 grams of formic acid per gram of bark during the pyrolysis and about half of the formic acid was found to have decomposed to water and carbon monoxide. It is noted that in Table I below nitrogen gas in the amounts given above was used in each case so that the table reports only the amount of water or organic vapor used in conjunction with the nitrogen.

The reactor tube was encircled by a heavy-duty electric furnace which was controlled by a variable transformer. The bottom end of the tube was attached by means of a standard taper fitting to at two-neck receiving flask. The other neck of the receiver was fitted to a cold water condenser, which in turn was attached by means of rubber tubing to a cold trap in a "Dry Ice" bath and thence to the water aspirator which served to reduce the pressure on the system. Prior to commencing the heating, the pressure was reduced to a pressure equivalent to about 20 millimeters of mercury. Lower pressures did not still further improve the pyrolyzate yield. Heating was discontinued after a bed temperature of 450° C. had been reached, and about 90 minutes were required for the pyrolysis.

In order to obtain the product weight given in Table I below, the light brown oil or tar in the receiver was evaporated to dryness in a nitrogen atmosphere and weighed as was the charcoal remaining in the glass reactor tube. The experiment was repeated with no vapor (nitrogen gas stream only) and also with various organic materials and water to obtain the yields for various organic vapors and water reported in Table I.

*Table I*

| Vegetable Material | Vapor addition to Nitrogen Gas, g./g of dry bark | Yield percent of Oven Dry Bark Weight | |
|---|---|---|---|
| | | Pyrolyzate | Charcoal |
| Slash pine bark | None | 22 | 47 |
| Do | 2.0—Formic acid | 40 | 29 |
| Do | 2.0—Ethanol | 24 | 44 |
| Do | 2.0—Water | 22 | 42 |
| Do | 2.0—Acetic Acid | 24 | 46 |
| Do | 2.0—Cyclohexanol | 21 | 47 |

The results in the above table clearly show that none of the organic materials tried, or water, significantly affected the yield of low molecular weight compounds over the yield obtained by sweeping the pyrolyzate tube with nitrogen alone, except in the run where formic acid vapors were introduced, and in that instance the yield of low molecular weight product substantially doubled with a corresponding decrease in the charcoal obtained.

Similar increases in low molecular weight product yield will be obtained in the pyrolysis of lignin under the conditions of the present example, but at 400° C. and using 1 part by weight of formic acid vapor per part of lignin. Again the pyrolysis of lignite can be carried out under the conditions of the example, but at 100 mm. of Hg pressure to result in substantially increased yields of the low molecular weight products.

Due to the surprising increase in the amount of pyrolyzate obtained when the reactor tube was swept with formic acid vapors together with nitrogen flow, the procedure of Example I was repeated with radio-labelled ($C^{14}$) formic acid to establish that the formic acid or its decomposition products were not contributing to the weight of pyrolyzate by reacting chemically with the phenolic materials. Only trace radioactivity of an amount far below that necessary to account for the weight increase in the pyrolyzate was found in the pyrolyzate although the weight increase in the pyrolyzate was substantially the same as that obtained in Example I. Likewise, the charcoal was found to contain only traces of radioactivity, and it was clear that the increase in amount of pyrolyzate product was due to the presence of the formic acid vapors although they did not contribute weight in the pyrolysis products.

EXAMPLE II

The procedure of Example I was repeated using Southern pine wood instead of bark and 3 parts by weight of formic acid vapor per gram of wood over the pyrolysis period as the sole vapor added, i.e., without the nitrogen of Example I. A 56% yield of pyrolyzate and a 18% yield of charcoal was realized. Similarly increased yields are obtained using amounts of about one part by weight of formic acid vapor per part of bark.

While specific examples of methods embodying the present inevntion have been described above, it will be apparent that many changes and modifications may be made in the methods of procedure without departing from the spirit of the invention. It will therefore be understood that the examples cited and the methods and procedures set forth above are intended to be illustrative only and are not intended to limit the invention.

Having thus described the invention there is claimed:

1. A method of increasing the yield of pyrolyzate obtained by the pyrolysis of natural vegetable materials comprising the steps of heating under subatmospheric pressure said materal, the dimensions of which are such that at least one dimension does not exceed about 2 inches, to a temperature of about 150° C. to about 500° C. to effect pyrolysis and liberate low molecular weight compounds for a period of time in excess of about 5 minutes and sweeping same from the reaction zone during pyrolysis by passing thru said zone and the natural materials contained therein a gas consisting essentially of formic acid vapors.

2. In the process for effecting the pyrolysis of natural vegetable materials selected from the group consisting of barks, lignins, tannins, lignite, nut shells, hogged woods, sawdust and brush at a pressure of about 20 mm. to about 100 mm. of Hg and recovering the low molecular weight compounds produced, the steps of heating said materials, the dimensions of which are such that at least one dimension of the resulting pieces does not exceed about 2 inches, to a temperature of about 150° C. to about 500° C. for a period of time of about 5 minutes to about 4 hours to effect pyrolysis and liberate low molecular weight compounds and simultaneously passing through said materials a gas selected from the group consisting of formic acid vapors and mixtures thereof with an inert gas selected from the group consisting of nitrogen, carbon dioxide, superheated steam and mixtures thereof.

3. The process of claim 2 wherein the natural vegetable materials are sized so that at least one dimension of the resulting pieces does not exceed about ¼ inch.

4. The process of claim 2 where the amount of formic acid vapor introduced in the gaseous sweeping stream during pyrolysis is from about 1 part to about 3 parts by weight of the natural vegetable materials undergoing pyrolysis.

5. The process of claim 2 wherein the natural vegetable material is lignin and the temperature is about 400° C.

6. The process of claim 1 wherein the natural material is comminuted coniferous bark and the pressure is about 20 mm. to about 100 mm. of Hg.

7. The process of claim 2 wherein the natural material is lignite.

References Cited by the Examiner
UNITED STATES PATENTS
2,725,346  7/54  Farber _____ 202—21

FOREIGN PATENTS
477,670  10/51  Canada.
533,598  11/56  Canada.

OTHER REFERENCES
Chemical Abstracts, vol. 56, Apr. 1, 1962, p. 8970(H).

MORRIS O. WOLK, *Primary Examiner.*
CHARLES B. PARKER, LEON ZITVER, *Examiners.*